US006622583B2

(12) United States Patent
Wang

(10) Patent No.: US 6,622,583 B2
(45) Date of Patent: Sep. 23, 2003

(54) AUTOMATIC TRANSMISSION SHIFTER LEVER AND TRANSFER CASE SHIFTER LEVER INTERLOCK MECHANISM

(75) Inventor: Yong Qiang Wang, Rochester Hills, MI (US)

(73) Assignee: Dura Global Technologies, Inc., Rochester Hills, MI (US)

(*) Notice: Subject to any disclaimer, the term of this patent is extended or adjusted under 35 U.S.C. 154(b) by 0 days.

(21) Appl. No.: 09/923,018

(22) Filed: Aug. 7, 2001

(65) Prior Publication Data

US 2003/0029265 A1 Feb. 13, 2003

(51) Int. Cl.[7] ............................................... B60K 20/00
(52) U.S. Cl. ................. 74/473.2; 74/473.18; 74/473.24
(58) Field of Search ........................ 74/473.18, 473.19, 74/473.2, 473.21, 473.24, 473.25, 473.26, 473.28, 473.33

(56) References Cited

U.S. PATENT DOCUMENTS

| | | |
|---|---|---|
| 5,490,434 A | 2/1996 | Osborn et al. |
| 6,000,296 A | 12/1999 | Sundquist |
| 6,176,809 B1 | 1/2001 | Visser et al. |

Primary Examiner—William C Joyce
Assistant Examiner—Brad Van Pelt
(74) Attorney, Agent, or Firm—Richard M. Mesche; Casimir B. Kiczey

(57) ABSTRACT

A shifter system includes an automatic transmission shifter lever movable along a first shift path in forward and rearward directions and a transfer case shifter lever movable along a second shift path in the forward and rearward directions. The automatic transmission shifter lever is also movable in lateral directions to provide an auto stick option. The second shift path is laterally adjacent the first shift path a short distance to reduce space. An interlock mechanism is provided to prevent contact between the shifter levers. The interlock mechanism includes a blocker pivotable between a locking position wherein the blocker limits movement of the transfer case shifter lever along the second shift path and an unlocking position wherein the blocker does not limit movement of the transfer case shifter lever along the second shift path.

18 Claims, 8 Drawing Sheets

AUTOMATIC TRANSMISSION SHIFTER LEVER AND TRANSFER CASE SHIFTER LEVER INTERLOCK MECHANISM

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

1. Field of the Invention

The present invention generally relates to manually-operated shifter levers for controlling automatic transmissions and transfer cases of motor vehicles and, more particularly, to an interlock mechanism acting between the shifter levers which prevents operation of one shifter lever when the other shifter lever is in a particular position.

2. Background of the Invention

Automatic transmission shifters of motor vehicles, wherever mounted, are used to manually control gear ratios of a transmission. The automatic transmission shifter typically has a shifter lever which is pivotable over a series of positions representative of desired gear ratios such as, for example, park, reverse neutral, drive and one or more lower. The shifter lever is connected to the motor vehicle transmission by a suitable mechanical and/or electronic operating linkage to effect actuation of the transmission to the selected gear ratio. Some automatic transmission shifters are also provided with a "tiptronic" or "auto stick (A/S)" shifting option wherein the automatic transmission can be manually shifted up or down one gear level by incrementally moving the shifter lever. For example, the transmission can be manually shifted up one gear level from first gear to second gear or manually shifted down one gear level from second gear to first gear. See U.S. Pat. Nos. 5,070,740 and 5,791,197 for examples of A/S shifting systems, the disclosures of which are expressly incorporated herein in their entireties.

Transfer case shifter levers of 4-wheel drive motor vehicles, wherever mounted, are used to manually control operation ranges provided by gearing of a transfer case. The transfer case shifter typically has a shifter lever which is pivotable over a series of positions representative of desired operation ranges such as, for example, 4-wheel high, neutral, and 4-wheel low. The shifter lever is connected to the motor vehicle transfer case by a suitable mechanical and/or electronic operating linkage to effect actuation of the transfer case to the selected operation range.

In some 4-wheel drive motor vehicles having automatic transmissions, the automatic transmission shifter lever and the transfer case shifter lever are each mounted on a center console adjacent one another. Because more and more control features are being integrated into the instrument panel and the center console of motor vehicles, the amount of space allotted for the shifters is becoming smaller an smaller. The automatic transmission shifter lever and the transfer case shifter lever of some vehicles are assembled together having a common base and bezel in order to reduce the overall size of the shifters.

While these constructions provide useful and effective control of transmissions and transfer cases, in some cases the shifter levers can be very close and even interfere with each other during some movements. This is particularly true when at least one of the shifters is not a straight-line shifter, that is a shifter which requires some movement of the shifter lever transverse to the forward/rearward direction of the motor vehicle, such as is common with an automatic transmission shifter having an A/S option. Accordingly, there is a need in the art for an improved shifter system having both an automatic transmission shifter lever and a transfer case shifter lever wherein the shifter levers are located very close without interference therebetween.

SUMMARY OF THE INVENTION

The present invention provides a shifter system which overcomes at least some of the above-noted problems of the related art. According to the present invention, a shifter system comprises, in combination, a first shifter lever movable along a first shift path in forward and rearward directions and in lateral directions substantially perpendicular to the forward and rearward directions and a second shifter lever movable along a second shift path in forward and rearward directions. The second shift path is located laterally adjacent the first shift path. An interlock mechanism includes a blocker movable between a locking position wherein the blocker prevents movement of the second shifter lever to a first portion of the second shift path from a second portion of the second shift path and an unlocking position wherein the blocker permits movement of the second shifter lever to the first portion of the second shift path from the second portion of the second shift path. The blocker moves to the locking position when the first shifter lever is laterally moved toward the second shift path and moves to the unlocking position when the first shifter lever is laterally moved away from the second shift path.

According to another aspect of the present invention, a shifter system comprises, in combination, a first shifter lever movable along a first shift path in forward and rearward directions and in lateral directions substantially perpendicular to the forward and rearward directions and a second shifter lever movable along a second shift path in forward and rearward directions. The second shift path is located laterally adjacent the first shift path. An interlock mechanism includes a blocking flange carried by the second shifter lever. The blocking flange is adapted to block movement of the first shifter lever laterally toward the second shifter lever when the second shifter lever is along a first portion of the second shift path and to permit movement of the first shifter lever laterally toward the second shifter lever when the second shifter lever is along a second portion of the second shift path.

According to yet another aspect of the present invention, a shifter system comprises, in combination, an automatic transmission shifter lever movable along a first shift path in forward and rearward directions and a transfer case shifter lever movable along a second shift path in forward and rearward directions. The automatic transmission shifter lever is also movable in lateral directions substantially perpendicular to the forward and rearward directions to provide an auto stick option. The second shift path is located laterally adjacent the first shift path. An interlock mechanism includes a blocker pivotable between a locking position wherein the blocker prevents movement of the transfer case shifter lever to a first portion of the second shift path from a second portion of the second shift path and an unlocking position wherein the blocker permits movement of the transfer case shifter lever to the first portion from the second shift path from the second portion of the second shift path. The blocker is operably connected to the automatic transmission shifter lever so that lateral movement of the automatic transmission shifter lever toward the second shift path pushes the blocker to the locking position from the unlocking position and lateral movement of the automatic transmission shifter lever away from the second shift path pulls the blocker to the unlocking position from the locking position. The interlock mechanism further includes a blocking flange carried by the second shifter lever. The blocking flange is adapted to block movement of the blocker to the locking position from the unlocking position and movement of the first shifter lever laterally toward the second shifter lever when the second shifter lever is along the first portion of the second shift path and to permit movement of the blocker to the locking position from the unlocking position and movement of the first shifter lever laterally toward the second shifter lever when the second shifter lever is along the second portion of the second shift path.

From the foregoing disclosure and the following more detailed description of various preferred embodiments it will be apparent to those skilled in the art that the present invention provides a significant advance in the technology and art of motor vehicle shifter systems. Particularly significant in this regard is the potential the invention affords for providing a high quality, reliable, low cost assembly which utilizes a relatively small amount of center console space. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
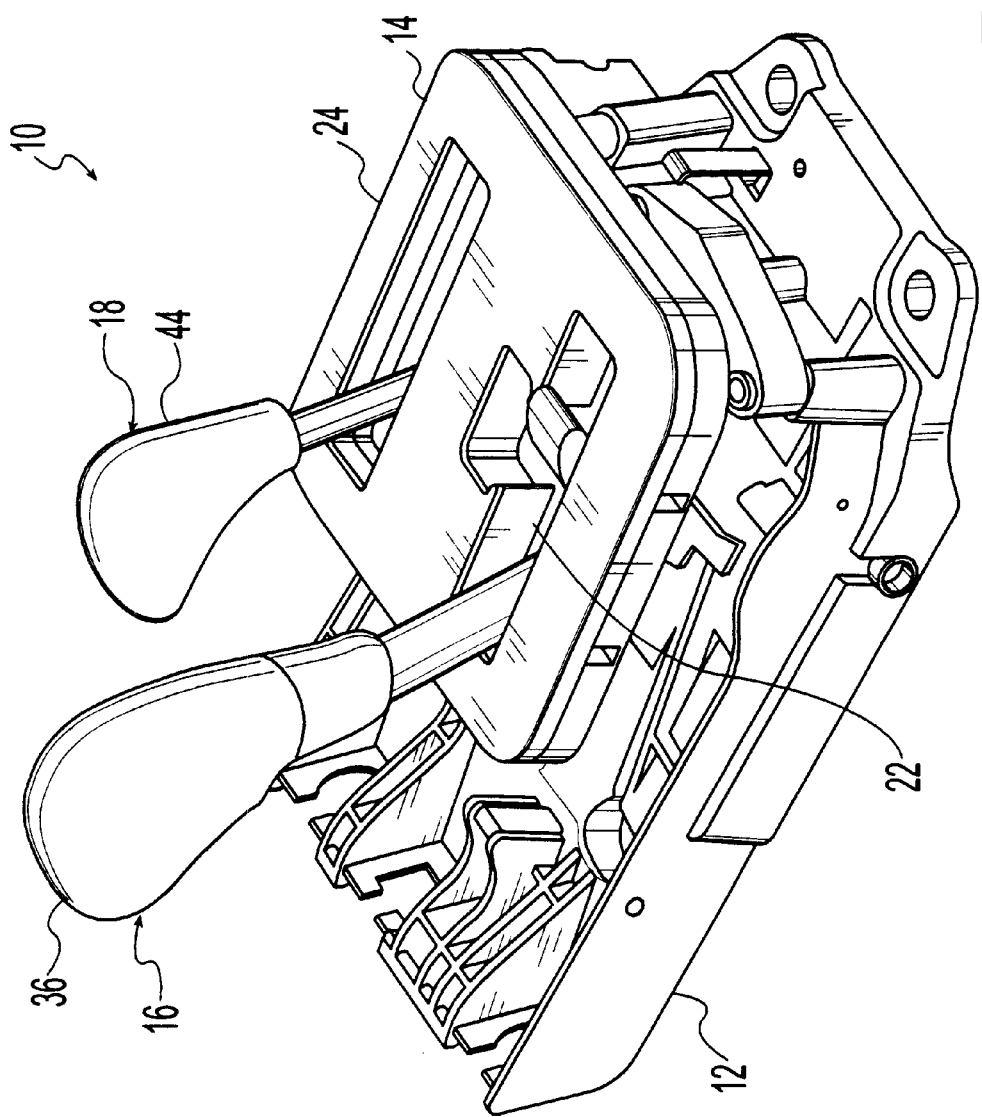
FIG. 1 is a perspective view of a shifter system having both an automatic transmission shifter lever and a transfer case shifter lever according to the present invention.
Figure 2:
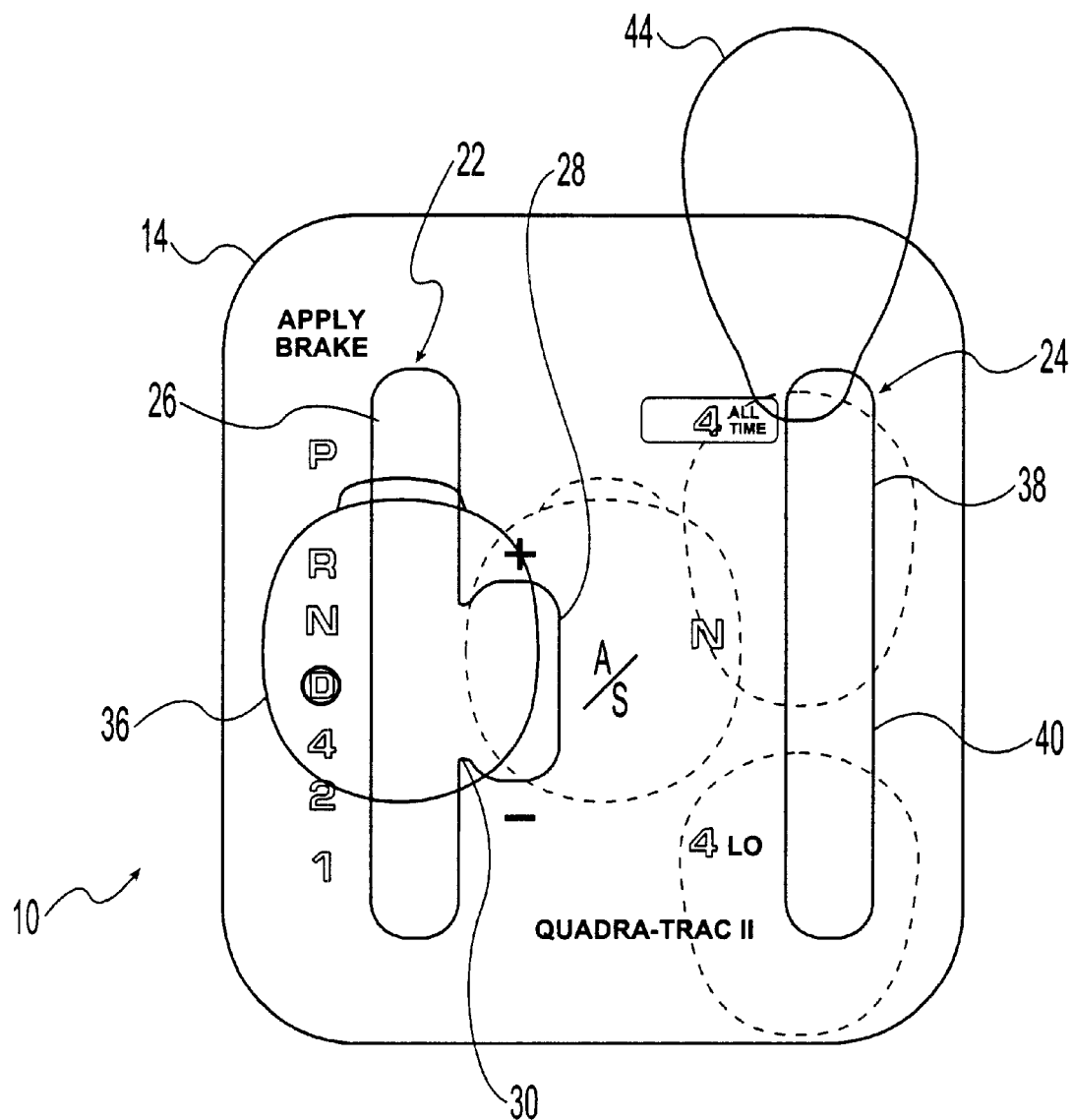
FIG. 2 is a diagrammatic top plan view of the shifter system of FIG. 1 showing a possible interference of the shifter levers in broken line.

It should be understood that the appended drawings are not necessarily to scale, presenting a somewhat simplified representation of various preferred features illustrative of the basic principles of the invention. The specific design features of a shifter system as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter system illustrated in the drawings. In general, up or upward refers to an upward direction within the plane of the paper in FIGS. 5 and 6 and down or downward refers to a downward direction within the plane of the paper in FIGS. 5 and 6. Also in general, fore or forward refers to a direction toward the front of the vehicle, that is, to the top within the plane of the paper in FIG. 2 and aft or rearward refers to a direction toward the rear of the vehicle, that is, to the bottom within the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter system disclosed herein. The following detailed discussion of various alternative and preferred embodiments will illustrate the general principles of the invention with reference to a shifter system for a motor vehicle such as an automobile, sport utility vehicle (SUV), or pickup truck. Other embodiments suitable for other applications will be apparent to those skilled in the art given the benefit of this disclosure.

Referring now to the drawings, FIGS. 1 to 6 show a shifter system 10 according to a preferred embodiment of the present invention. The illustrated shifter system 10 is adapted to be located at a center console of the motor vehicle and includes a base 12, a bevel 14, a first shifter lever 16, a second shifter lever 18, and an interlock mechanism 20. The first and second shifter levers 16, 18 are pivotally mounted to the base 12 and extend through the bezel 14. The bezel 14 has first and second openings 22, 24 formed therein which define first and second shift paths or gates for the first and second shifter levers respectively. The shifter levers 16, 18 extend through the bezel 14 which is preferably secured to the base 12. The base 12 and the bezel 14 are preferably molded from a plastic but can alternatively be formed in other suitable manners and/or of other suitable materials.

The illustrated first shifter lever 16 is an automatic transmission shifter lever with a tiptronic or auto stick (A/S) option. The first shift path 22 preferably includes first and second portions 26, 28 which are each linear and extend in the forward/rearward direction. The illustrated second portion 28 is laterally spaced-apart from the first portion 26 in a direction toward the second shift path 24 so that the first and second portions 26, 28 are substantially parallel. The illustrated second portion 28 has a shorter length than the first portion 26 and is longitudinally centered with the first portion 26, that is, they share a common central axis in the forward/rearward direction. The first shift path 22 also includes third or connecting portion 30 which is linear and extends in the transverse direction and substantially perpendicular to the first and second portions 26, 28. The third portion 30 is sized and shaped to centrally connect the first and second portions 26, 30. A plurality of shifter positions are formed along the first shift path which are associated with desired conditions of the gear transmission of the motor vehicle. The first portion 26 is associated with a park (P) position, a reverse (R) position, a neutral (N) position, a drive (D) position, and at least one low gear such as the illustrated low fourth gear (4), low second gear (2) and low first gear (1). The second portion 28 is associated with a up-shift position (+) wherein the gear transmission is shifted up one gear and a down-shift (−) position wherein the gear transmission is shifted down one gear. The upper surface of the bezel 14 is preferably provided with indicia indicating the locations of the shifter positions. Note that in the illustrated embodiment, the first shifter lever 16 can only be moved from the first portion 26 toward the second or auto stick (A/S) portion 28 from the drive (D) position of the first portion 26.

The first shifter lever 16 is pivotably mounted to the base 12 so that the first shifter lever 16 pivots in a forward/rearward direction about a first pivot axis 32 which extends in a transverse or lateral direction. Mounted in this manner, the first shifter lever 16 can linearly pivot along either the first or second portions 26, 28 of the first shift path 22. The illustrated first shifter lever 16 also pivots in a side-to-side or transverse direction about a second pivot axis 34 which extends in a forward/rearward direction. Mounted in this manner, the first shifter lever 16 can laterally pivot along the third portion 30 of the first shift path 22 between the first and second portions 26, 28. Accordingly, the illustrated first shifter lever 16 is a non-straight-line shifter, that is, a shifter which requires some movement of the shifter lever transverse to the forward/rearward direction of the motor vehicle. The first shifter lever 16 is suitably connected to the gear transmission for actuation of the gear transmission in a known manner such as, for example, mechanical actuation with a push-pull cables or electronic actuation with sensors and wires. The upper end of the first shifter lever 16 is preferably provided with a knob or handle 36 so that the first shifter lever 16 can be manually moved along the first shift path 22 between the shift positions by an operator of the motor vehicle.

The illustrated second shifter lever 18 is a transfer case shifter lever. The second shift path 14 is preferably linear and extends in the forward rearward direction. The illustrated second shift path 24 is laterally spaced-apart from the first shift path 22 and is substantially parallel to the first and second portions 26, 28 of the first shift path 22. The illustrated second shift path 24 is longitudinally centered with the first shift path 22, that is, they share a common central axis in the forward/rearward direction. A plurality of shifter positions are formed along the second shift path 24 which are associated with desired conditions of the transfer case of the motor vehicle. The illustrated second shift path 24 is associated with a four-wheel-drive high gear (4 ALL TIME) position, a neutral (N) position, and a four-wheel-drive low gear (4 LO) position. Preferably, a first or rearward portion 38 of the second shift path 24 includes the neutral (N) position and the four-wheel-drive low gear (4 LO) position and a second or forward portion 40 of the second shift path 24 includes the four-wheel-drive high gear (4 ALL TIME) position. The upper surface of the bezel 14 is preferably provided with indicia indicating the locations of the shifter positions.

The second shifter lever 18 is pivotably mounted to the base 12 so that the first shifter lever 16 pivots in a forward/rearward direction about a third pivot axis 42 which extends in a transverse or lateral direction. In the illustrated embodiment the third pivot axis 42 is substantially coaxial with the first pivot axis 32. Mounted in this manner, the second shifter lever 18 can linearly pivot along the second shift path 24. Accordingly, the illustrated second shifter lever 18 is a straight-line shifter, that is, a shifter which only requires movement of the shifter lever in the forward/rearward direction of the motor vehicle. The second shifter lever 18 is suitably connected to the transfer case of the motor vehicle for actuation of the transfer case in a known manner such as, for example, mechanical actuation with a push-pull cables or electronic actuation with sensors and wires. The upper end of the second shifter lever 18 is preferably provided with a knob or handle 44 so that the second shifter lever 18 can be manually moved over the second shift path 24 by an operator of the motor vehicle.

As best shown in FIGS. 3–6, the interlock mechanism 20 preferably includes an interlock lever or blocker 46 which selectively prevents movement of the second shifter lever 18 from the second portion 40 of the second shift path 24 to the first portion 38 of the second shift path 24, an interlock bracket 48 which operably connects the first shifter lever 16 to the interlock lever 46, and a gate 50 which supports the interlock lever 46. As best shown in FIG. 7, the illustrated interlock lever 46 includes a generally rectangularly-shaped base 52 having forward and rearward extending pivot pins 54, 56 extending from the bottom of the base 52. The pivot pins 54, 56 preferably have substantially flat or planar upper and lower sides 58, 60 to form a "double D" shape. A channel or groove 62 is formed in the top of the base 52. The groove 62 extends in the forward/rearward direction to form inward facing first and second abutments 64, 66. A blocker head 68 transversely extends from the side of the base 52. The head 68 preferably forms substantially planar forward and rearward facing engagement surfaces 70. The illustrated interlock lever 46 has a spring member 72 to resiliently hold the interlock lever 46 into desired positions against movement relative to the base 12 without unwanted rattling as described in more detail hereinafter. The interlock lever 46 is preferably molded of a plastic as a unitary component including the base 52, the pivot pins, 54, 56, the head 68 and the spring member 72.

Figure 8A:
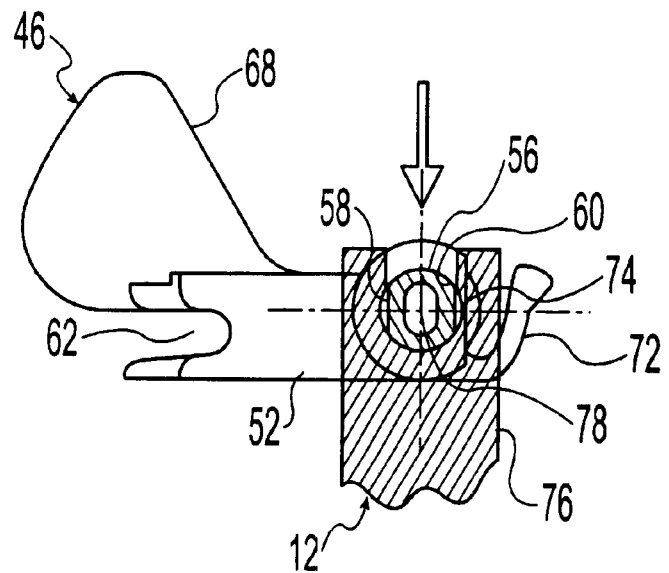
FIG. 8A is an enlarged, fragmental rear elevational view, partially in cross section, showing installation of the interlock lever of the interlock mechanism of FIGS. 5 and 6.
Figure 8B:
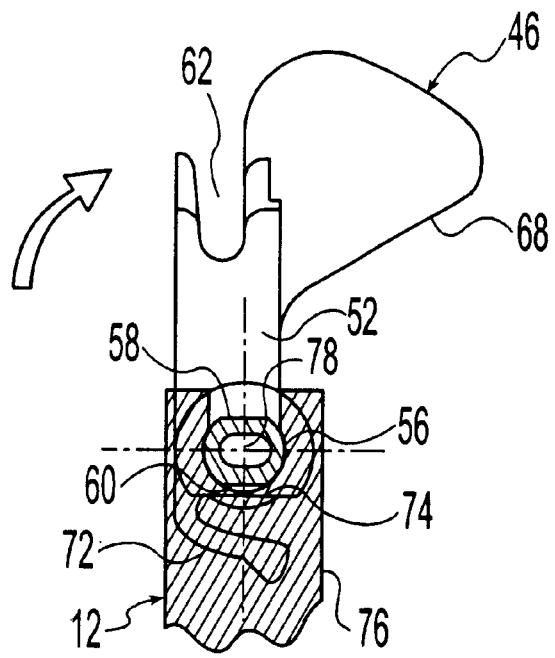
FIG. 8B is an elevational view similar to FIG. 8A but showing the interlock lever after installation.

As best shown in FIGS. 8A and 8B, the pivot pins 54, 56 of the interlock lever 46 are pivotally received in a pair of openings 74 formed by trunions 76 of the base 12 so that the lever 46 is pivotable about a forward/reward extending pivot axis 78. The trunions 76 are preferably located between the first and second shifter levers 16, 18. The trunion openings 74 are open at an upper side so that the pivot pins 54, 56 can be easily inserted and removed from the trunion openings 74 when the interlock lever 46 is rotated ninety degrees so that the flat upper and lower sides 58, 60 of the pivot pins 54, 56 are laterally facing (best shown in FIG. 8A). Once the pivot pins 54, 56 are within the openings 74 and the interlock lever 46 is rotated back about ninety degree so that the flat upper and lower sides 58, 60 are at the top and bottom, the interlock lever 46 is pivotally secured to the base 12 (best shown in FIG. 8B). Mounted in this manner, the interlock lever 46 is pivotable between an unlocking position (shown in FIGS. 3, 5, and 8B) and a locking position (shown in FIGS. 4 and 6).

As best shown in FIGS. 3–6, the illustrated bracket 48 is generally L-shaped having a generally horizontal main portion 80 and a downwardly extending flange portion 82 from one end of the main portion 80. The bracket 48 is preferably formed of a metal such as a steel but can alternatively be any other suitable material. The main portion 80 is rigidly secured to the first shifter lever 16 at a height generally at the top of the interlock lever 46 so that the flange portion 82 of the bracket 48 is located at the channel 62 of the interlock lever 46. The bracket 48 is preferably welded to the first shifter lever 16 but can alternatively be secured in any other suitable manner. The flange portion 82 of the bracket 48 and the channel 62 of the interlock lever 46 are suitably sized and shaped to cooperate such that lateral movement of the first shifter lever 16 toward the second shift path 24, that is toward the second shifter lever 18, moves the interlock lever 46 from the unlocking position to the locking position and lateral movement of the first shifter lever 16 away from the second shift path 24, that is away from the second shifter lever 18, moves the interlock member 46 from the locking position to the unlocking position. When the first shifter lever 16 pivots toward the second shifter lever 18, the flange portion 82 of the bracket 48 engages the first abutment 64 of the channel 62 to push the interlock member 46 from the unlocking position to the locking position. When the first shifter lever 16 pivots away from the second shifter lever 18, the flange portion 82 of the bracket 48 engages the second abutment 66 of the channel 62 to pull the interlock member 46 from the locking position to the unlocking position.

Figure 6:
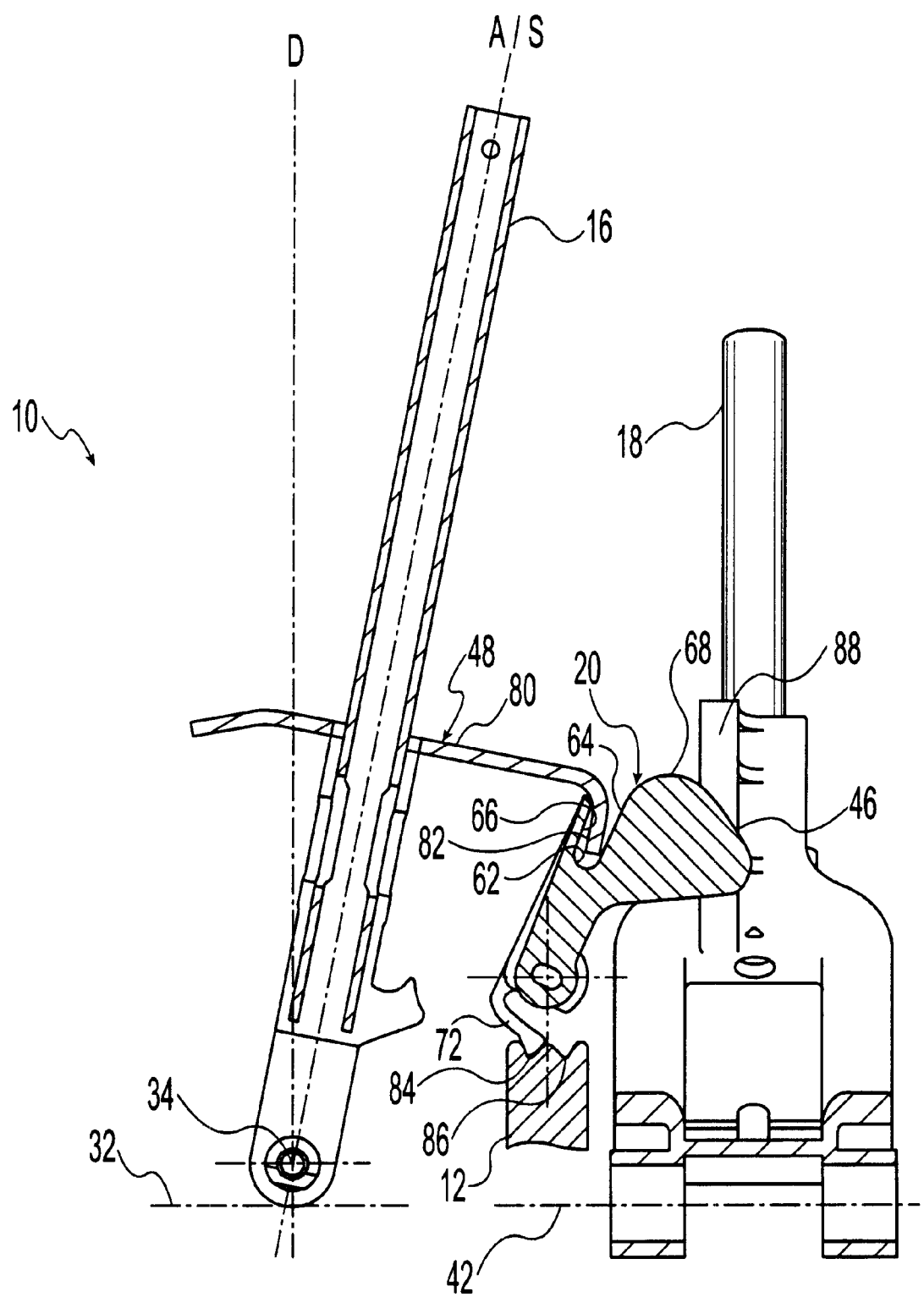
FIG. 6 is an enlarged, fragmented rear elevational view, in cross section, similar to FIG. 5 but showing the interlock mechanism of the shifter system of FIG. 4 wherein the automatic transmission shifter lever in the A/S position.
Figure 7:
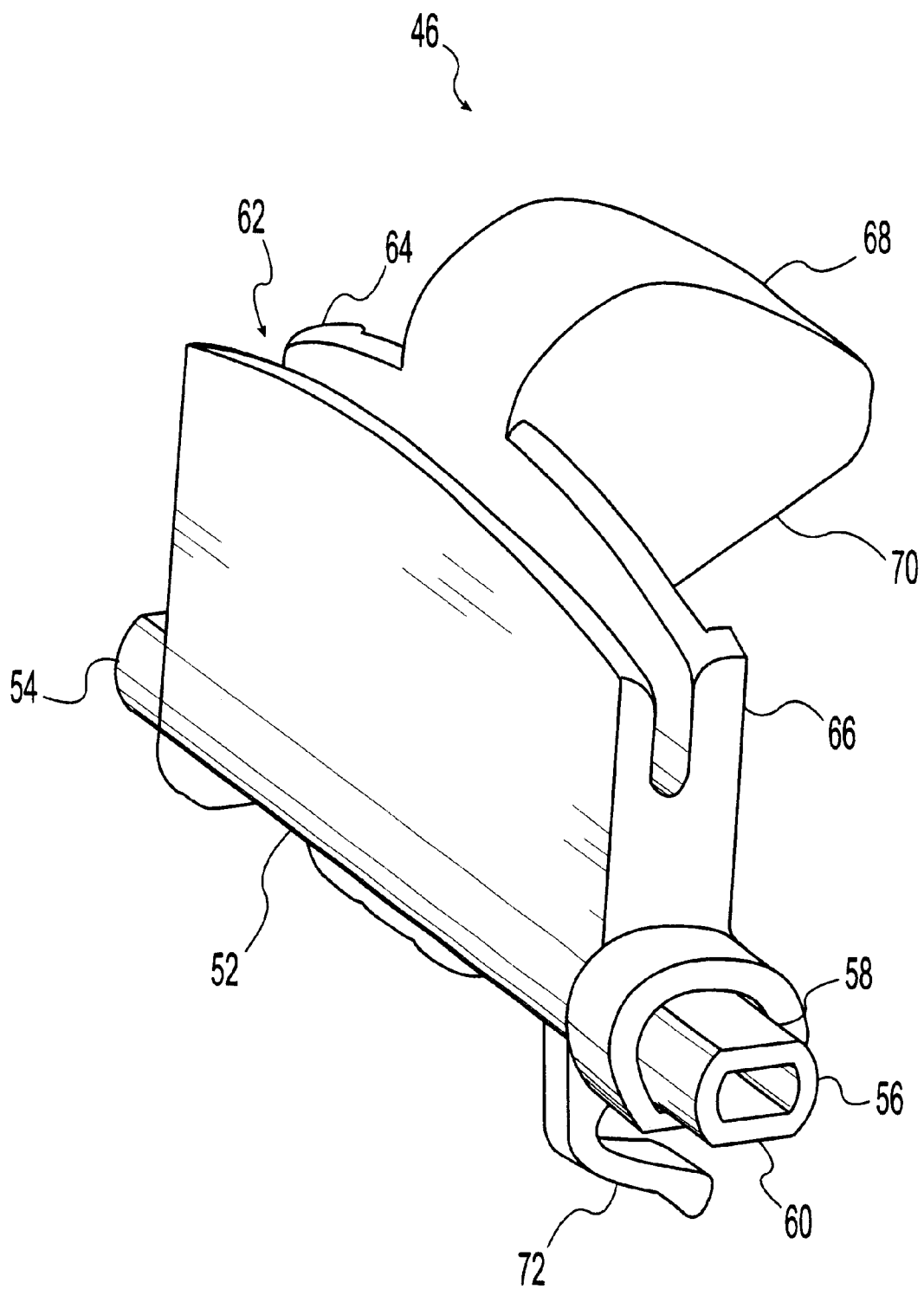
FIG. 7 is perspective view of an interlock lever of the interlock mechanism of FIGS. 5 and 6.

As best shown in FIGS. 6 and 7, first and second notches 84, 86 are formed in the base 12 which are sized and shaped to receive the spring member 72 of the interlock lever 46 when the interlock lever 46 is in the unlocking and locking positions respectively. The spring member 72 and the notches 84, 86 cooperate to resiliently hold the interlock lever against movement relative to the base 12 when the interlock lever 46 is in the locking and unlocking positions. Holding the interlock lever 46 in this manner substantially reduces vibrations and rattles created by the interlock member 46. Lateral movement of the first shifter lever 16, however, overcomes the bias of the spring member 72 to permit movement of the interlock lever 46 between the unlocking and locking positions.

Figure 3:
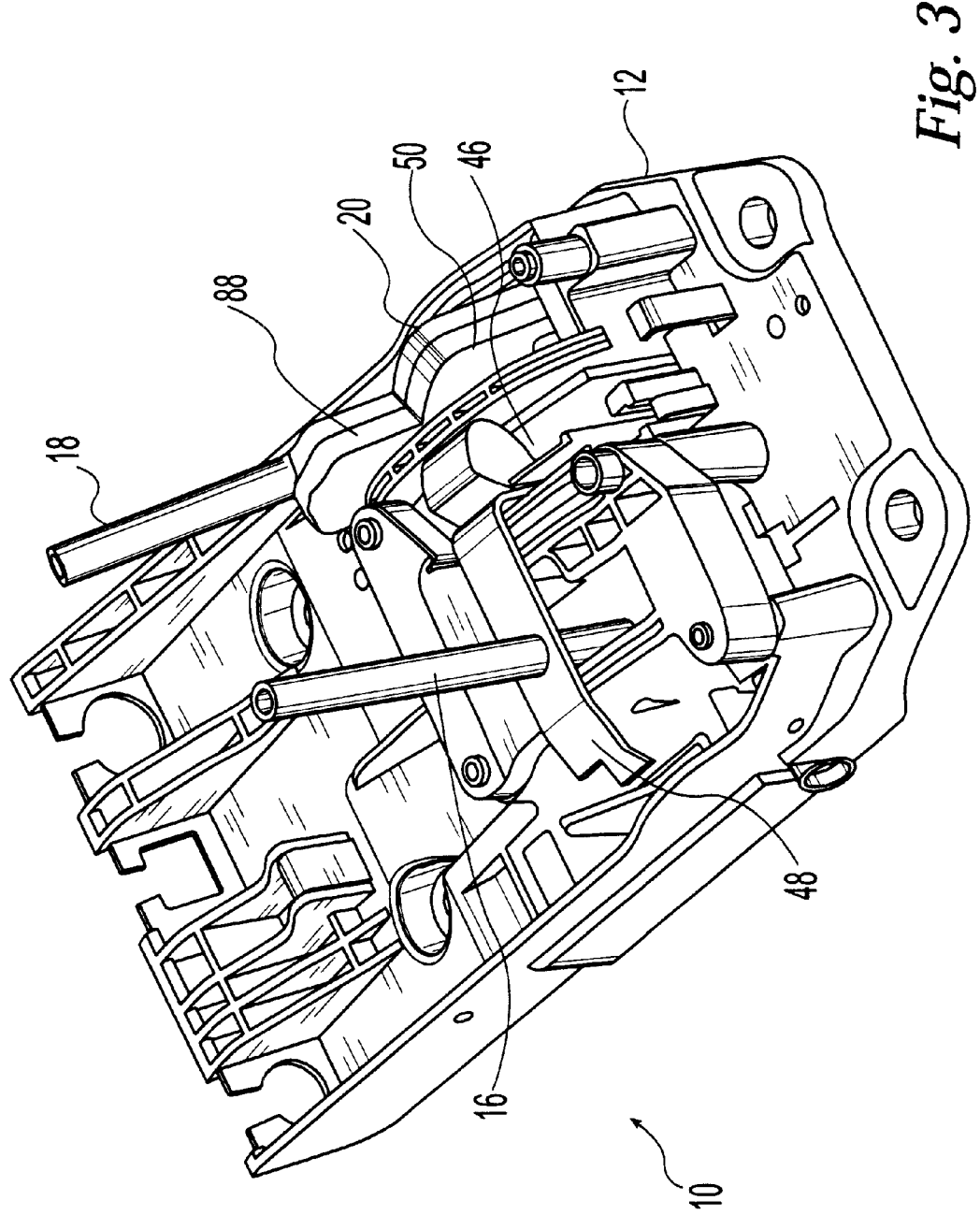
FIG. 3 is a perspective view of the shifter system of FIG. 1 with the automatic transmission shifter lever in a drive position, wherein certain components have been removed for clarity.
Figure 4:
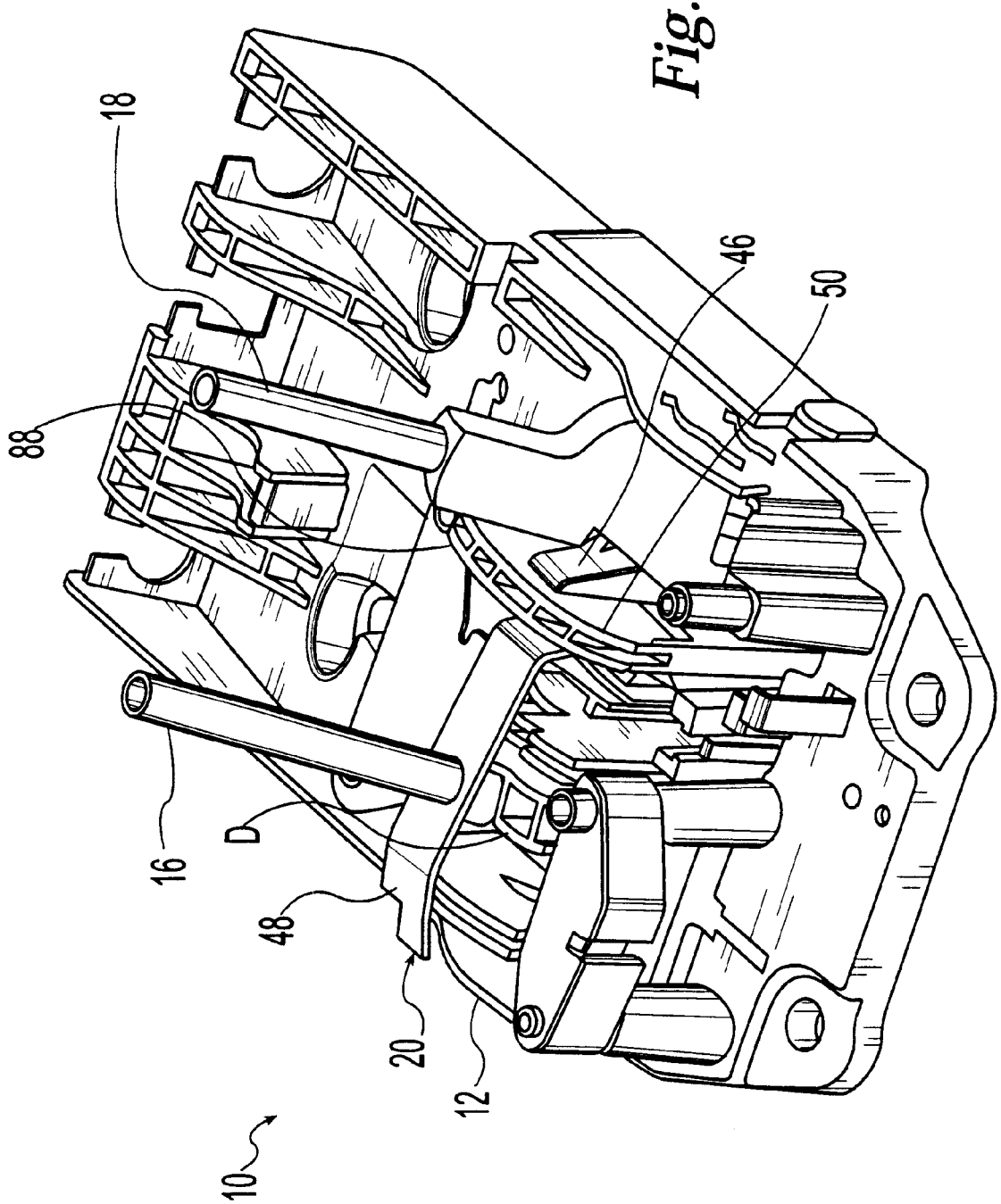
FIG. 4 is a perspective view of the shifter system of FIG. 1 with the automatic transmission shifter lever in an auto stick (A/S) position, wherein certain components have been removed for clarity.
Figure 5:
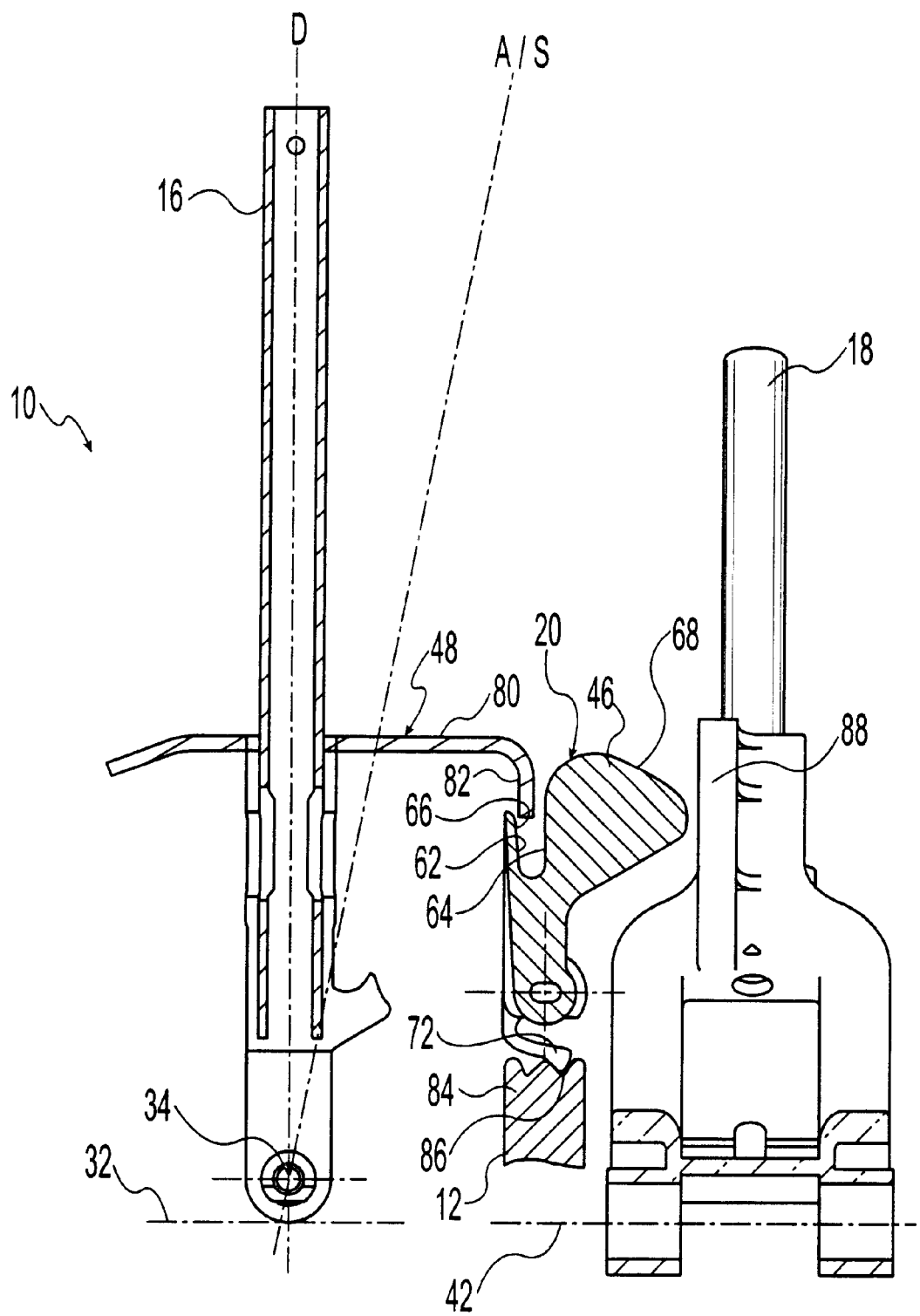
FIG. 5 is an enlarged, fragmented rear elevational view, in cross section, showing an interlock mechanism of the shifter system of FIG. 3 wherein the automatic transmission shifter lever in the drive position.

As best shown in FIGS. 3 and 5, the head 68 of the interlock lever 46 does not block movement of the second shifter lever 18 along any portion of the second shift path 24 when the interlock lever 46 is in the unlocking position. However, when the interlock lever 46 is moved to the locking position with the second shifter lever 18 in the second portion 40 of the second shift path 24, that is, in the four-wheel-drive high gear position, the locking lever 46 extends into the path of the second shifter lever 18 and prevents movement of the second shift lever 18 from the second portion 40 of the second shift path 24 to the first portion 38 of the second shift path 24, that is, to either the neutral position or the four-wheel-drive low gear position. The blocker head 68 blocks the second shift path 24 and creates an interference with the second shifter lever 18 which prevents rearward movement of the second shifter lever 18. Preventing this movement of the second shifter lever 18, prevents contact between the shifter lever knobs 36, 44 which would otherwise interfere (best shown in broken line in FIG. 2).

The head 68 of the interlock member 46 laterally extends through the gate 50 formed by the base 12. The gate 50 forms an opening sized to closely receive the head 68 therein but to allow lateral pivoting motion of the head 68 therethrough. If the operator attempts to move the second shifter lever 18 when the interlock lever 46 is in the locking position and the second shifter lever 18 engages the interlock member 46, the gate 50 supports the interlock member 46 so that loads are transferred to the gate 50 through the engagement surfaces 70 rather than to the pivot pins 54, 56.

The illustrated interlock mechanism also includes a blocker flange or wing 88 carried by the second shifter lever 18. The blocker flange 88 is sized and shaped to form an interference and block movement of the interlock member 46 from the unlocking position to the locking position when the second shifter lever 18 is in the first portion 38 of the second shift path 24, that is, in the neutral position or the four-wheel-drive low gear position and to permit movement of the interlock lever 46 from the unlocking position to the locking position when the second shifter lever 18 is in the second portion 40 of the second shift path 24, that is, in the four-wheel-drive high gear position. Lateral movement of the first shifter lever 16 is prevented because the blocker head 68 engages the blocker flange 88 to prevent the interlock element 46 from pivoting to the locking position. Preventing this movement of the first shifter lever 16 prevents contact of the shifter lever knobs 36, 44 which would otherwise interfere (best shown in broken line in FIG. 2).

From the forgoing description it is apparent that the present invention provides a shifter system having first and second shifter levers 16, 18 that utilizes a relatively small amount of space yet eliminates the possibility of contact between the knobs 36, 44 of the shifter levers 16, 18.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A shifter system comprising, in combination:
   a first shifter lever movable along a first shift path in forward and rearward directions and in lateral directions substantially perpendicular to the forward and rearward directions;
   a second shifter lever movable along a second shift path in forward and rearward directions;
   wherein the second shift path is laterally adjacent the first shift path;
   an interlock mechanism including a blocker movable between a locking position wherein the blocker prevents movement of the second shifter lever to a first portion of the second shift path from a second portion of the second shift path and an unlocking position wherein the blocker permits movement of the second shifter lever to the first portion from the second shift path from the second portion of the second shift path;
   wherein the blocker moves to the locking position when the first shifter lever is laterally moved toward the second shift path and moves to the unlocking position when the first shifter lever is laterally moved away from the second shift path; and
   wherein said blocker pivots between the locking position and the unlocking position.

2. The shifter system according to claim 1, wherein said first shifter lever is an automatic transmission shifter lever which can manually shift up and down one gear level.

3. The shifter system according to claim 2, wherein said second shifter lever is a transfer case shifter lever.

4. The shifter lever according to claim 3, wherein said first portion of the second shift path includes a low gear position and the second portion of the second shift path includes a high gear position.

5. The shifter system according to claim 1, wherein said blocker includes at least one pivot pin about which the blocker pivots and wherein the pivot pin is double-D-shaped.

6. The shifter system according to claim 1, wherein said blocker is operably connected to the first shifter lever so that lateral movement of the first shifter lever toward the second shift path pushes the blocker to the locking position from the unlocking position and lateral movement of the first shifter lever away from the second shift path pulls the blocker to the unlocking position from the locking position.

7. The shifter system according to claim 1, wherein the interlock mechanism further includes a blocking flange carried by the second shifter lever and wherein the blocking flange is adapted to block movement of the blocker to the locking position from the unlocking position and movement of the first shifter lever laterally toward the second shifter lever when the second shifter lever is along the first portion of the second shift path and to permit movement of the blocker to the locking position from the unlocking position and movement of the first shifter lever laterally toward the second shifter lever when the second shifter lever is along the second portion of the second shift path.

8. The shifter system according to claim 7, wherein the blocker engages the blocker flange when the second shifter lever is in the first portion of the second shift path to prevent lateral movement of the first shifter lever toward the second shift path.

9. A shifter system comprising, in combination:
a first shifter lever movable along a first shift path in forward and rearward directions and in lateral directions substantially perpendicular to the forward and rearward directions;
a second shifter lever movable along a second shift path in forward and rearward directions;
wherein the second shift path is laterally adjacent the first shift path;
an interlock mechanism including a blocker movable between a locking position wherein the blocker prevents movement of the second shifter lever to a first portion of the second shift path from a second portion of the second shift path and an unlocking position wherein the blocker permits movement of the second shifter lever to the first portion from the second shift path from the second portion of the second shift path;
wherein the blocker moves to the locking position when the first shifter lever is laterally moved toward the second shift path and moves to the unlocking position when the first shifter lever is laterally moved away from the second shift path;
wherein said blocker is operably connected to the first shifter lever so that lateral movement of the first shifter lever toward the second shift path pushes the blocker to the locking position from the unlocking position and lateral movement of the first shifter lever away from the second shift path pulls the blocker to the unlocking position from the locking position; and
wherein said blocker forms a channel, the interlock mechanism further includes a bracket secured to the first shifter for movement therewith, and the bracket includes a flange extendable into the channel such that the flange moves along the channel when the first shifter lever moves in the forward and rearward direction to permit relative movement between the bracket and the blocker and the flange engages walls of the channel when the first shifter lever moves in the lateral directions to move the blocker with the bracket.

10. A shifter system comprising, in combination:
a first shifter lever movable along a first shift path in forward and rearward directions and in lateral directions substantially perpendicular to the forward and rearward directions;
a second shifter lever movable along a second shift path in forward and rearward directions;
wherein the second shift path is laterally adjacent the first shift path;
an interlock mechanism including a blocker movable between a locking position wherein the blocker prevents movement of the second shifter lever to a first portion of the second shift path from a second portion of the second shift path and an unlocking position wherein the blocker permits movement of the second shifter lever to the first portion from the second shift path from the second portion of the second shift path;
wherein the blocker moves to the locking position when the first shifter lever is laterally moved toward the second shift path and moves to the unlocking position when the first shifter lever is laterally moved away from the second shift path; and
wherein the first and second shifter levers are mounted to a base and the interlock mechanism further includes a spring member which resiliently holds the blocker against movement relative to the base when the blocker is in the locking position and the unlocking position.

11. A shifter system comprising, in combination:
a first shifter lever movable along a first shift path in forward and rearward directions and in lateral directions substantially perpendicular to the forward and rearward directions;
a second shifter lever movable along a second shift path in forward and rearward directions;
wherein the second shift path is laterally adjacent the first shift path;
an interlock mechanism includes a blocking flange carried by the second shifter lever;
wherein the blocking flange is adapted to block movement of the first shifter lever laterally toward the second shifter lever when the second shifter lever is along a first portion of the second shift path and to permit movement of the first shifter lever laterally toward the second shifter lever when the second shifter lever is along a second portion of the second shift path; and
wherein the interlock mechanism further includes a blocker pivotable between a locking position wherein the blocker prevents movement of the second shifter lever from the second portion of the second shift path to the first portion of the second shift path and an unlocking position wherein the blocker permits movement of the second shifter lever from the second portion of the second shift path to the first portion of the second shift path, and wherein the blocker pivots to the locking position when the first shifter lever is laterally moved toward the second shift path and pivots to the unlocking position when the first shifter lever is laterally moved away from the second shift path.

12. The shifter system according to claim 11, wherein the blocker engages the blocker flange when the second shifter lever is in the first portion of the second shift path to prevent lateral movement of the first shifter lever toward the second shift path.

13. The shifter system according to claim 11, wherein said first shifter lever is an automatic transmission shifter lever which can manually shift up and down one gear level.

14. The shifter system according to claim 11, wherein said second shifter lever is a transfer case shifter lever.

15. The shifter lever according to claim 14, wherein said first portion of the second shift path includes a low gear position and the second portion of the second shift path includes a high gear position.

16. A shifter system comprising, in combination:
   an automatic transmission shifter lever movable along a first shift path in forward and rearward directions;
   wherein the automatic transmission shifter lever is movable in lateral directions substantially perpendicular to the forward and rearward directions to manually shift up and down one gear level;
   a transfer case shifter lever movable along a second shift path in forward and rearward directions;
   wherein the second shift path is laterally adjacent the first shift path;
   an interlock mechanism including a blocker pivotable between a locking position wherein the blocker prevents movement of the transfer case shifter lever to a first portion of the second shift path from a second portion of the second shift path and an unlocking position wherein the blocker permits movement of the transfer case shifter lever to the first portion from the second shift path from the second portion of the second shift path;
   wherein said blocker is operably connected to the automatic transmission shifter lever so that lateral movement of the automatic transmission shifter lever toward the second shift path pushes the blocker to the locking position from the unlocking position and lateral movement of the automatic transmission shifter lever away from the second shift path pulls the blocker to the unlocking position from the locking position; and
   the interlock mechanism further including a blocking flange carried by the second shifter lever; and
   wherein the blocking flange is adapted to block movement of the blocker to the locking position from the unlocking position and movement of the first shifter lever laterally toward the second shifter lever when the second shifter lever is along the first portion of the second shift path and to permit movement of the blocker to the locking position from the unlocking position and movement of the first shifter lever laterally toward the second shifter lever when the second shifter lever is along the second portion of the second shift path.

17. The shifter system according to claim 16, wherein said blocker forms a channel, the interlock mechanism further includes a bracket secured to the first shifter for movement therewith, and the bracket includes a flange extendable into the channel such that the flange moves along the channel when the first shifter lever moves in the forward and rearward direction to permit relative movement between the bracket and the blocker and the flange engages walls of the channel when the first shifter lever moves in the lateral directions to move the blocker with the bracket.

18. The shifter lever according to claim 16, wherein said first portion of the second shift path includes a low gear position and the second portion of the second shift path includes a high gear position.

* * * * *